Patented Feb. 14, 1950

2,497,061

UNITED STATES PATENT OFFICE 2,497,061

ALKANEDIONE DIOXIMES AS ANTIOXIDANTS FOR PRESERVING ORGANIC COMPOSITIONS WHICH TEND TO DETERIORATE BY THE ABSORPTION OF OXYGEN FROM THE AIR

Henry B. Kellog, Binghamton, N. Y.

No Drawing. Application March 24, 1947,
Serial No. 736,620

14 Claims. (Cl. 99—163)

This invention relates to anti-oxidants for preserving organic substances which tend to deteriorate by absorption of oxygen from the air.

An object of the present invention is to provide a new class of anti-oxidants embodying alkanedione dioximes which, when present in very low concentrations, have the characteristic property of retarding the premature oxidation of organic substances which tend to deteriorate by absorption of oxygen from the air.

Other objects and features of the invention will become more apparent as the description proceeds.

The above and other objects of the present invention are accomplished by adding to organic compositions which tend to deteriorate by the absorption of oxygen from the air, a small quantity of an alkanedione dioxime of the general formula:

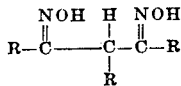

wherein R represents an alkyl group, e. g., methyl, ethyl, propyl, butyl, hexyl and the like.

Compounds which fall under this general classification are, 3-methyl-2,4 - pentanedione dioxime, 4-ethyl-3,5-heptanedione dioxime, 5-propyl-4,6-nonanedione dioxime, 6-butyl-5,7-undecanedione dioxime and the like.

The anti-oxidants of the present invention are compounds obtained by the action of a primary nitroparaffin on an alkyl amine in a solvent medium such as water. These compounds are readily synthesized according to the process described in United States Patent 2,340,271.

The anti-oxidants of the present invention may be employed in practically any type of organic material which is susceptible to oxidation such as, for example, rubber compositions comprising india rubber, balata, gutta percha; synthetic vulcanizable products, e. g., polychloroprene, olefin polysulfides, polybutadiene, butadiene-styrene copolymers such as Buna S, butadiene-acrylonitrile copolymers such as Buna N and the like, whether or not the same have been admixed with the conventional fillers, pigment, curing agents and the like. All of these rubber and rubber-like materials are characterized by a high elasticity, indicated by a high percentage of extensibility under load and favorable retraction to approximately original size and shape when the load is removed, and in addition a good tensile strength, good flexure and abrasion resistance, and reactivity with sulfur. The proportion of the anti-oxidant employed may range from 0.1% to 5% and is mixed with rubber or rubber-like material in powder form or in solution in a suitable solvent such as those subsequently referred to, before vulcanization. Since these anti-oxidants have substantially no accelerating effect, there is no need for adjustment of vulcanizing conditions.

When employed in 1-2% concentration, the anti-oxidants of the present invention not only serve as age-resistors for improving the age-resistance of treated rubber or rubber-like stocks, but also show the unexpected characteristics of providing a very valuable increase in the flex-cracking resistance of the stocks to which they are added.

In white stocks, the anti-oxidants of the present invention in contrast to many of the commercial anti-oxidants do not stain the treated rubber or rubber-like stock either when the stocks are exposed to direct sunlight or ordinary diffused light, whereas prior anti-oxidants have the very serious fault of producing a highly objectionable discoloration of the treated rubber stocks under the influence of light.

The anti-oxidants may be employed in any type of drying oil composition, such as paints, enamels, varnishes, etc., as well as in the drying oils such as linseed oil, tung oil, etc., used in their manufacture. Their action in quick drying compositions, such as paints and varnishes is to prevent the breakdown of the drying oil film which is due to brittleness caused by oxidation products or a peculiar gel structure which depends, probably, upon the manner of cooking the resin and drying oil if the drying oil composition is a varnish. When used as anti-oxidants in paints, varnishes and enamels, the quantity may range from 0.01% to 0.5% based on the non-volatile content of the paint, varnish or enamel composition. When used as anti-oxidants in drying oils, the quantity may be from 0.01% to 0.5%. Their action in drying oils is to inhibit the action of gaseous oxygen when confined in containers, interrupt the induction period (superficial peroxide formation) until the normal oxidation rate has progressed to the desirable stage of drying, and retarding subsequent oxidation whereby the life of the dried film is extended.

The anti-oxidants of the present invention mix readily with any type of organic material. If the material to which they are added is a liquid such as cracked gasoline, lubricating oils containing olefinic bodies, aldehydes, essential oils, paints, varnishes, enamels, drying oils and the like, the anti-oxidants may be dissolved in any one or a mixture of the following solvents and the solution thereof mixed with the liquid material. The selection of the solvent or solvent mixture will depend upon its solubility in the liquid material:

| | |
|---|---|
| Acetone | Ethyl acetate |
| Amyl acetate | Ethanol |
| Amyl alcohol | Ethyl lactate |
| Amyl ether | Ethyl methyl ketone |
| Benzyl alcohol | Isophorone |
| Butyl acetate | Methanol |
| Cellosolve | Methyl carbitol |
| Cellosolve acetate | Methyl cellosolve |
| Diacetone alcohol | 2-methyl pentanediol |
| Diethyl carbitol | Phenyl cellosolve |
| Dimethyl dioxane | Tetra-ethylene glycol |
| Dimethyl formamide | Triethanolamine |
| Dioxane | Triethyl citrate |
| Ether | |

If, on the other hand, the material to which they are added is a solid such as rubber, rubber-like materials, soaps and the like, the anti-oxidants may be incorporated by either milling or mastication in powder form, paste, or solution form.

In order to better disclose the invention in detail, the following examples are furnished. It should be understood, however, that these examples are illustrative only and are not intended to limit the scope of the invention.

Example I

A varnish which had a pronounced tendency to skin was prepared according to the following formula:

| | |
|---|---|
| Modified phenolic oil-soluble resin (Durez 220V) | 1.0 |
| China-wood oil _____fluid ounces | 38.0 |
| Petroleum thinner _____do | 64.0 |

Dryers equivalent to 0.4% lead: 0.3% manganese and 0.01% cobalt based on the weight of drying oil.

The China-wood oil and 12 ounces of the resin were heated to 550° F. for 30 minutes. The balance of the resin was added and the varnish cooled to 450° F. and thinned with the mineral spirits. When the thinned varnish reached room temperature, 23 grams of mixed dryers were added thereto. The material thus obtained was a very rapid drying varnish which contained substantially 51% of non-volatile matter, and when flowed on a clean wooden panel, dried hard to touch in 3½ hours.

Three separate 100 gram portions of the finished varnish prepared in the manner described above were weighed out. To each separate portion, 0.2% of 3-methyl-2,4-pentanedione dioxime, 0.2% of 4-ethyl-3,5-heptanedione and 0.2% of 5-propyl-4,6-nonanedione dioxime respectively, dissolved in 5 cc. of dioxane was added based on the non-volatile content of the varnish. Small vials were filled about half-full with these varnish portions using two vials (2 ounce and 4 ounce) for each test. Samples of the untreated varnish were likewise included for comparison. The vials were stoppered and examined for skinning at regular intervals. To those samples, both treated and untreated, which did not skin at the end of 4 days, a fresh supply of air was admitted. A skin was considered to have formed when it had sufficient strength to support the varnish when the vials were inverted. This type of accelerated test is equivalent to several weeks or months for varnishes packed in cans with the usual small air space which is allowed, provided the cans are not opened until the contents are to be used. At the end of 4 days, the non-inhibited varnish in both the 2 oz. and 4 oz. bottles formed a skin. After 33 days the inhibited varnish did not form a skin in either the 2 oz. or the 4 oz. bottles.

Inhibited varnish samples which showed no skinning after standing over a month were flowed over a clean wooden panel. Samples of the untreated varnish were also flowed over in the same manner on identical panels for purposes of comparison. The dried panels of the treated and non-treated varnish were exposed in a Weather-o-meter for a period of 7 cycles (equivalent to about 11 weeks). The cycle used in this artificial weathering apparatus consists of the following weather conditions ever 24 hours, which is taken as a cycle:

| | |
|---|---|
| 1 hour | Rain |
| 2 hours | Light |
| 2 hours | Rain |
| 18 hours | Light |
| 1 hour | Blank |
| 24 hours | Total |

After 35 cycles in the Weather-o-meter the panels coated with the uninhibited varnish showed cracks, roughness, peeling, brittleness and other usual undesirable weathering characteristics, whereas the panels coated with the inhibited varnish did not exhibit any of the undesirable characteristics but showed a marked improvement in the film durability. This indicates that the inhibitors counteracted the undesirable oxidation effects in the latter stages of the drying process, thereby increasing the varnish film durability and counteracting the wrinkle formation by retarding superficial oxidation.

These anti-oxidants mix readily with oleoresins and also act as gelation inhibitors in tung oil varnish cooking. They do not increase the viscosity or give any false body. Their added advantages are their light color and mild odor, thus preventing the darkening or coloring of light straw-colored varnishes. They do not react with driers such as those of lead, cobalt and manganese and in fact act as neutral bodies in varnishes, enamels, and the like.

Example II

A white rubber composition was prepared according to the following formula:

| | Parts by weight |
|---|---|
| Natural rubber | 100 |
| Zinc oxide | 5 |
| Titanium dioxide | 20 |
| Whiting | 80 |
| Paraffin | 1.5 |
| Sulfur | 3.2 |
| Captax (mercaptobenzothiazole) | 1.0 |
| Tuads (tetraethyl thiuram disulfide) | 0.2 |
| 3-methyl-2,4-pentanedione dioxime | 2.0 |

The same composition as above, but containing no anti-oxidant, was also prepared, and both compositions cured in a mold for one-half hour at 270° F. to produce an optimum cure. When the cured composition containing no anti-oxidant was subjected to the usual aging tests, it was found that the deterioration of the stock containing the anti-oxidant was one-fifth to one-fourth of that of the same stock containing no anti-oxidant.

Example III 100 grams of cod liver oil having an iodine number of approximately 154 was divided into two equal portions and each portion placed in a 4 oz.

wide mouth bottle. To one portion of the oil, 5 cc. of a 5% solution of 3-methyl-2,4-pentadione dioxime in amyl ether was added as an anti-oxidant. Both bottles were lightly stoppered with absorbent cotton and placed into a heated oven having a temperature of about 75° C. After 3 days both samples were removed from the oven and cooled to room temperature. The sample of oil containing no anti-oxidant had a pronounced rancid odor, whereas the sample containing the anti-oxidant was unaffected.

While I have disclosed the preferred embodiments of my invention, it will be readily apparent to those skilled in the art that many changes and variations may be made therein without departing from the spirit thereof. The scope of the invention is to be limited solely by the appended claims.

I claim:

1. An organic substance which tends to deteriorate by the absorption of oxygen from the air containing, in anti-oxidizing amount, an alkanedione dioxime of the following general formula:

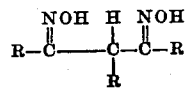

wherein R is an alkyl group.

2. An organic substance which tends to deteriorate by the absorption of oxygen from the air containing, in anti-oxidizing amount, an alkanedione dioxime having the formula:

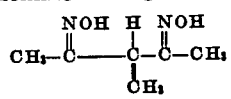

3. An organic substance which tends to deteriorate by the absorption of oxygen from the air containing, in anti-oxidizing amount, an alkanedione dioxime having the formula:

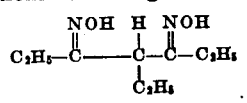

4. An organic substance which tends to deteriorate by the absorption of oxygen from the air containing, in anti-oxidizing amount, an alkanedione dioxime having the formula:

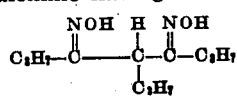

5. A coating composition containing a drying oil, a dryer, and an anti-oxidizing amount of an alkanedione dioxime of the following general formula:

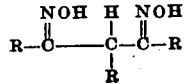

wherein R is an alkyl group, in sufficient quantity to substantially prevent oxidation of the composition in the packaged state without materially retarding the normal drying rate of the composition when exposed in a thin film state to the normal atmosphere.

6. A coating composition containing a drying oil, an oil soluble resin, a dryer and an anti-oxidizing amount of 3-methyl-2,4-pentanedione dioxime.

7. A coating composition containing a drying oil, an oil soluble resin, a dryer and an anti-oxidizing amount of 4-ethyl-3,5-heptanedione dioxime.

8. A coating composition containing a drying oil, an oil soluble resin, a dryer and an anti-oxidizing amount of 5-propyl-4,6-nonanedione dioxime.

9. A coating composition according to claim 5 wherein the quantity of the oxidation inhibitor is 0.2% based upon the non-volatile content of the said coating composition.

10. A method of preventing the formation of skin on the surface of a packaged drying oil composition which comprises incorporating into the composition from 0.01% to 0.5% of an alkanedione dioxime of the following general formula:

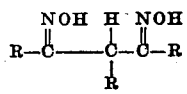

wherein R is an alkyl group.

11. A drying oil coating composition having incorporated therein from 0.01% to 0.5% of an alkanedione dioxime of the following general formula:

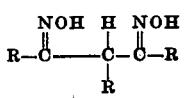

wherein R is an alkyl group.

12. A drying oil coating composition having incorporated therein from 0.01% to 0.5% of 3-methyl-2,4-pentanedione dioxime.

13. A drying oil coating composition having incorporated therein from 0.01% to 0.5% of 4-ethyl-3,5-heptanedione dioxime.

14. A drying oil coating composition having incorporated therein from 0.01% to 0.5% of 5-propyl-4,6-nonanedione dioxime.

HENRY B. KELLOG.

REFERENCES CITED

The following references are of record in the file of this patent:

UNITED STATES PATENTS

| Number | Name | Date |
|---|---|---|
| 2,146,735 | Hale | Feb. 14, 1939 |
| 2,260,256 | Lippincott | Oct. 21, 1941 |